United States Patent
Stevens

(10) Patent No.: US 6,715,043 B1
(45) Date of Patent: Mar. 30, 2004

(54) METHOD AND SYSTEM FOR PROVIDING MEMORY-BASED DEVICE EMULATION

(75) Inventor: Curtis E. Stevens, Irvine, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

(21) Appl. No.: 09/336,307

(22) Filed: Jun. 18, 1999

Related U.S. Application Data

(63) Continuation-in-part of application No. 09/272,859, filed on Mar. 19, 1999.

(51) Int. Cl.[7] ............................................. G06F 12/02
(52) U.S. Cl. ........................ 711/154; 703/24; 711/203; 711/112
(58) Field of Search ........................... 703/13, 24, 27; 711/154, 203, 151, 112, 114, 111, 100; 714/6, 11; 709/219, 224

(56) References Cited

U.S. PATENT DOCUMENTS

| | | |
|---|---|---|
| 4,984,149 A | 1/1991 | Iwashita et al. |
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A * | 9/1992 | Flaherty et al. ............... 703/24 |
| 5,214,695 A | 5/1993 | Arnold et al. |
| 5,274,816 A | 12/1993 | Oka |
| 5,280,627 A | 1/1994 | Flaherty et al. |
| 5,297,124 A | 3/1994 | Plotkin et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,404,527 A | 4/1995 | Irwin et al. |
| 5,418,918 A | 5/1995 | Vander Kamp et al. |
| 5,437,018 A | 7/1995 | Kobayashi et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |

(List continued on next page.)

FOREIGN PATENT DOCUMENTS

| | | |
|---|---|---|
| EP | 0371166 A | 6/1990 |
| EP | 0845742 A | 6/1998 |
| GB | 2311389 A | 9/1997 |
| WO | WP 00/57274 * | 9/2000 ........... G06F/9/455 |

Primary Examiner—Pierre-Michel Bataille

(57) ABSTRACT

The present invention is a method and system for accessing at least one emulated readable storage in a processor-based system. The system comprises a memory for storing instruction sequences by which the processor-based system is processed. The memory has at least one readable emulated storage location. A processor is coupled to the memory, and the stored instruction sequences cause the processor to (a) detect an access to at least one readable storage element; (b) transfer the access to the at least one readable storage element to an access to at least one readable emulated storage location; and (c) process an instruction sequence corresponding to the access to the at least one readable storage element.

33 Claims, 10 Drawing Sheets

U.S. PATENT DOCUMENTS

| | | |
|---|---|---|
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,812,748 A * | 9/1998 | Ohran et al. .................. 714/11 |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 11/1998 | Takahashi |
| 5,832,493 A | 11/1998 | Marshall et al. |
| 5,838,948 A * | 11/1998 | Bunza .......................... 703/27 |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 5,953,516 A * | 9/1999 | Bonola ......................... 703/22 |
| 5,978,565 A * | 11/1999 | Ohran et al. .................. 714/10 |
| 6,023,507 A * | 2/2000 | Wookey ...................... 709/224 |
| 6,058,263 A | 5/2000 | Voth |
| 6,219,726 B1 * | 4/2001 | Ripberger ................... 711/151 |
| 6,263,412 B1 | 7/2001 | Townsend |
| 6,295,518 B1 * | 9/2001 | McLain et al. ............... 703/13 |
| 6,324,497 B1 | 11/2001 | Yates et al. |
| 6,330,594 B1 * | 12/2001 | Swart ......................... 709/219 |
| 6,446,141 B1 * | 9/2002 | Nolan et al. ................... 710/8 |
| 6,550,027 B1 * | 4/2003 | Dobrosielski ................ 714/720 |

\* cited by examiner

METHOD AND SYSTEM FOR PROVIDING MEMORY-BASED DEVICE EMULATION

The present application is a continuation-in-part of pending U.S. patent Ser. No. 09/272,859, filed Mar. 19,1999.

BACKGROUND OF THE INVENTION

1. Field of the Invention

The present invention relates generally to memory in processor-based or micro-controller-based systems, and more particularly, to a system and method of providing memory-based device emulation.

2. Description of the Related Art

In processor-based systems such as computers, an operating system must first be installed before other application software may be subsequently installed and executed. The operating system software is typically installed from compact disks or diskettes. In certain cases, the operating system must be extended via device drivers, or some other software component, to bring the system up to a level of performance required by the motherboard manufacturer or the system manufacturer. This creates several problems, involving the transport of these device drivers.

Systems are manufactured in stages. The first stage involves the gathering of various components to construct a system motherboard. The second stage involves creating a basic computer by combining a system motherboard with a power supply, hard drive and other internal components. The third stage involves the integration of the basic computer with various peripherals such as a monitor, printer, speakers, keyboard, and mouse.

Each manufacturing stage may have unique requirements, advancements in technology or involve different testing and failure resolutions. Because the various stages of manufacture can happen in different physical locations, and in different companies, device drivers or special software that is added to the target operating system adds extra cost to the system. This extra cost is incurred because the additional drivers or special software must be transported on a floppy disk, a compact disk, or other media with each system. Further, extra items like floppy disks or compact disks can easily be lost or stolen.

Moreover, as technology evolves, the system hardware can provide functionality that current operating systems are unable to use. Today, there is no reliable method available for the system firmware or BIOS to pass on the capability to control new hardware or provide extended system functionality. For example, systems are now incorporating real-time video display. Although the hardware is present to do this function, the operating system is unable to display the real-time video. As discussed earlier, a system manufacturer could supply the user with a diskette or compact disk (CD) that has the software necessary for displaying real-time video. The problem with this is that a motherboard can pass through several middle men before it is incorporated into a system and sold to and end-user, allowing the diskette or CD to be easily lost or destroyed.

Accordingly, there is a need in the technology for a system and method for overcoming the aforementioned problems. In particular, there is a need for a system and method for accessing applications typically stored on storage devices such as compact disks or digital video disks, where the storage device is not available.

BRIEF SUMMARY OF THE INVENTION

The present invention is a method and system for accessing at least one emulated readable storage in a processor-based system. The system comprises a memory for storing instruction sequences by which the processor-based system is processed. The memory has at least one readable emulated storage location. A processor is coupled to the memory, and the stored instruction sequences cause the processor to (a) detect an access to at least one readable storage element; (b) transfer the access to the at least one readable storage element to an access to at least one readable emulated storage location; and (c) process an instruction sequence corresponding to the access to the at least one readable storage element.

DETAILED DESCRIPTION OF THE PREFERRED INVENTION

Figure 1:
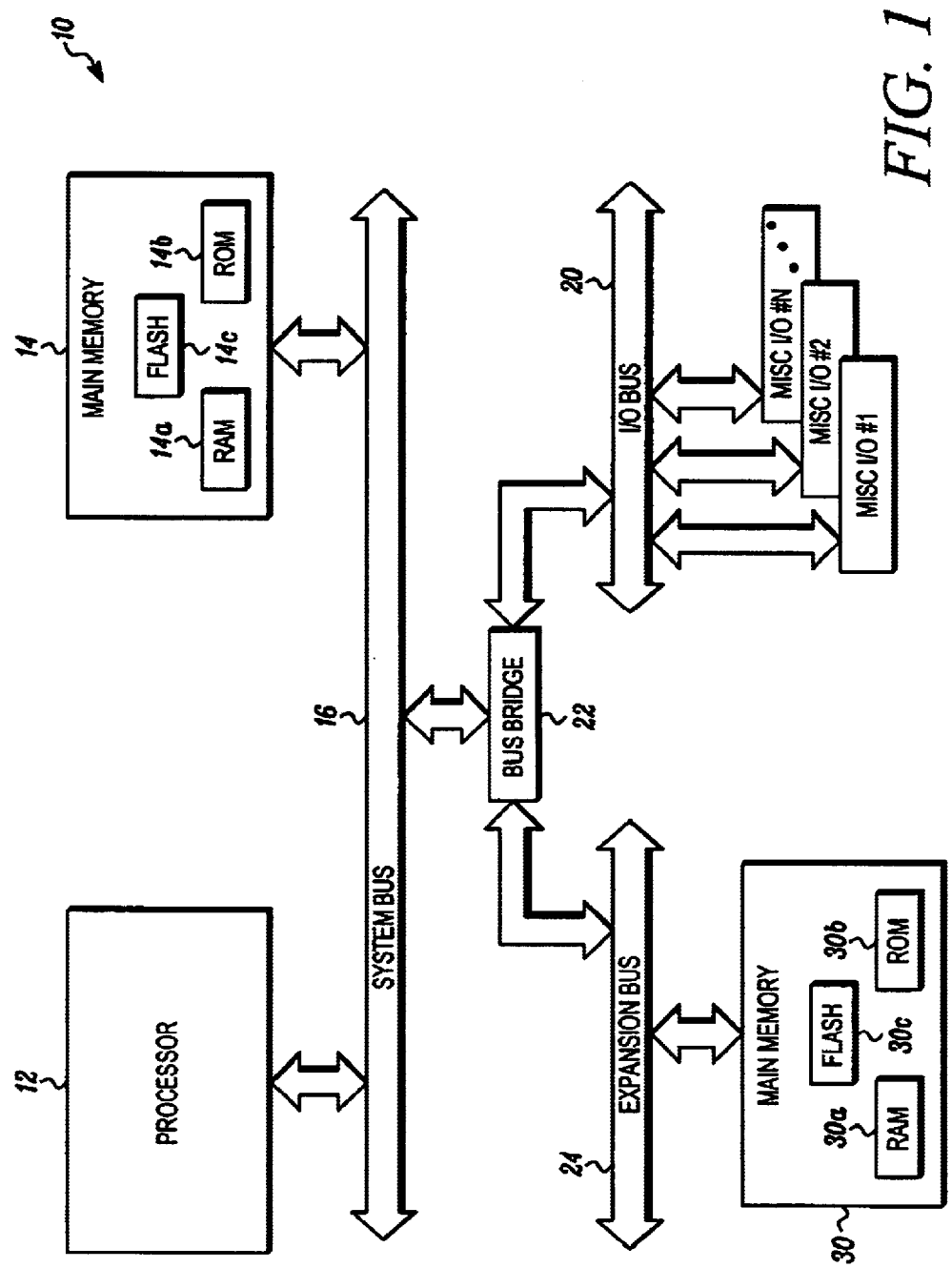
FIG. 1 is a system block diagram of an exemplary processor system in which the system and method of the present invention is used.

One aspect of the present invention relates to a system and method of providing memory-based device emulation. In one embodiment, the system comprises a memory for storing instruction sequences by which the processor-based system is processed. The memory has at least one readable emulated storage location. A processor is coupled to the memory, and the stored instruction sequences cause the processor to detect an access to at least one readable storage element, transfer the access to the at least one readable storage element to an access to the at least one readable emulated storage location, and process an instruction sequence corresponding to the access to the at least one readable storage element.

Another aspect of the invention relates to a system and method for providing an Infomediary. It involves the construction and maintenance of a secure and private repository of Internet user and system profiles, collected primarily from warranty service registrations, internet service registrations, system profiles and user preferences. Initially, this information is used to register the user with the manufacturers of purchased hardware and software products, and with the providers of on-line or other services. Over time, the user data will be used to profile and notify users of relevant software updates and upgrades, to encourage on-line purchases of related products and to enable one-to-one marketing and other services.

A further aspect of the invention relates to pre-boot screen messaging. Software or firmware may be used to provide customized screens in the form of messages possibly with embedded graphics, during the pre-boot process of the system. These messages may take on the form of an advertisement. In one embodiment, graphics that was previously stored on ROM may be retrieved for display on the screen during the pre-boot process. When a link has been established with the predetermined web site, additional graphics may be used. Such additions include updates or messages that are either provided arbitrarily or provided based on the information obtained from a survey of the user or the user's system. In one embodiment, once the boot process is completed, a portion of the display screen may be used to provide icons that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected messages or advertisements.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, file, payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. These messages may take the form of an advertisement. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications. Power On Self Test (POST) refers to the instructions that are executed to configure and test the system hardware prior to loading an OS.

Discussion of Embodiments of Invention

The present embodiment is described in reference to a processor system 10. FIG. 1 illustrates an exemplary processor system 10 which implements the processes of the present invention. The processor system 10 comprises a processor 12 (such as a central processing unit) and a memory module 14. The memory module 14 includes random access memory (RAM) 14a, a read-only memory (ROM) 14b and a flash memory 14c. In one embodiment, the memory module 14 is a main memory. The processor 12 and memory module 14 are coupled to a system bus 16. The processor system 10 may also include various I/O and peripheral modules (MISC I/O #1, #2, . . . #N) which are coupled along an I/O bus 20 that is in turn coupled to the system bus 16 via a bus bridge 22. Examples of the peripheral modules include a console, a printer and a mouse.

The processor system 10 may also include an expansion memory 30 that is coupled to the bus bridge 22 via an expansion bus 24. In one embodiment, the expansion memory 30 includes RAM 30a, ROM 30b and flash memory 30c. In one embodiment, the processor 12 includes any one of the x86, Pentium™, Pentium II™ and Pentium Pro™ microprocessors as marketed by Intel Corporation. In an alternate embodiment, the processor 12 may be the K-6 microprocessor as marketed by AMD. In a further embodiment, the processor 12 is the 6×86MX microprocessor as marketed by Cyrix Corp. Further examples of processors that may be utilized in the invention include the Alpha processor as marketed by Digital Equipment Corporation, the 680X0 processor as marketed by Motorola; or the Power PC processor as marketed by IBM. It is understood by one of ordinary skill in the technology that the present invention can be implemented in any processor-based system that implements an I/O fault detection mechanism and has non-dedicated storage elements.

Figure 2:
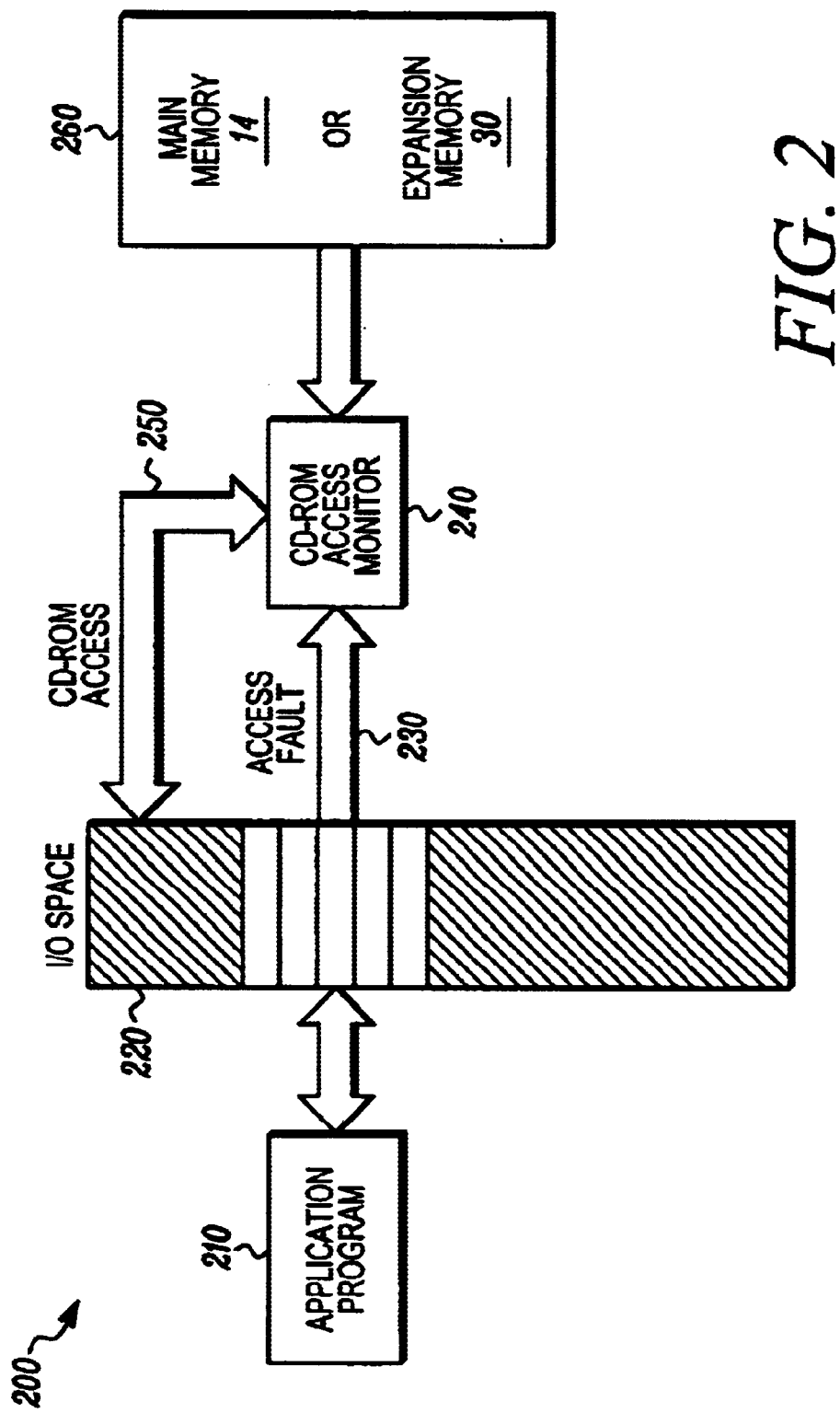
FIG. 2 is a block diagram illustrating the CD-ROM emulation access process 200 in accordance with one embodiment of the present invention.

FIG. 2 illustrates one embodiment of the memory-based storage device emulation access technique 200 of the present invention. The storage device may be any memory-based storage device, including but not limited to a compact disk (CD) drive, a digital video disk (DVD) drive, a tape drive, a floppy disk drive, a zip drive, a jazz drive, a high density floppy drive, document scanner, solid state memory device, high capacity removable media device, low capacity removable media device, combination high and low capacity removable media device, a hard disk drive and a magneto-optical disk drive, etc., as represented by MISC I/O devices #1–N of FIG. 1. For present discussion purposes, a media emulation access technique utilizing a CD-ROM will be referred to. It is understood that such the CD ROM is exemplary of one type of storage media, and the CD-ROM emulation access technique may be implemented using other storage media. The present invention provides an access monitor 240 which monitors an attempt to access a predetermined storage device such as CD-ROM (e.g., as represented by any one of the I/O devices MISC I/O #1–#N), by an application program 210 (that may be stored in memory 14, expansion memory 30 or be provided via any of the peripheral modules (MISC I/O #1, #2, . . . #N)) and transfers such an attempt as an access fault 230 that is subsequently used to provide access to an emulated CD-ROM area 260. In one embodiment, the CD-ROM image or the original CD-ROM data and code may be stored in RAM 14a, ROM 14*b* and/or flash memory 14*c*. Alternatively, the CD-ROM image may also be located in expansion memory RAM 30*a*, ROM 30*b* and/or flash memory 30*c*. In one embodiment, a copy of the CD-ROM image, called the emulated CD-ROM 260, is located in RAM 14*a* or 30*a*. Location of the emulated CD-ROM 260 in RAM 14*a* or 30*a* facilitates faster access to the data and code stored in the CD-ROM while preserving the original data and code in the CD-ROM image. In one embodiment, the access monitor 240 is located in RAM 14*a* or 30*a*.

In particular, the application program 210 attempts to access the CD-ROM by accessing one or more CD-ROM addresses via the I/Q space 220. In using the Intel Pentium processor or an IBM-compatible PC, such CD-ROM addresses include 1F0–2F7 and 3F6 or 170–177 and 376. When such attempts are detected by the processor 12, it generates an access fault 230 to the access monitor 240, which in turn issues an access signal 250 to transfer the access to the emulated CD-ROM 260. In one embodiment, the emulated CD-ROM 260 is located in the E000h segment (i.e., E000h–F000h) of main memory 14 (i.e., in flash 14*c*). In one embodiment, data located in the emulated CD-ROM 260 may subsequently be transferred to a destination requested by the access monitor 240. In one embodiment, the destination may be located in main memory 14, expansion memory 30 or in one or more of the processor registers (not shown) located in the processor 12.

The CD-ROM emulation access technique comprises two subprocesses: an initialization process 300 and an execution process 400, as described in detail in FIGS. 3–4 and in the following sections. A brief overview of the process is as follows: the emulated CD-ROM 260 is installed on the processor system 10 by the initialization process 300. During initialization, the CD-ROM emulation access initialization process 300 locates the emulated CD-ROM 260 contents. The initialization process 300 also allocates the memory location or processor registers that will be used to store the data from the emulated CD-ROM 260 to be used by the application program 210. The initialization process 300 next configures the access monitor 240 so that the access monitor 240 would gain control when access faults 230 (FIG. 2) to the emulated CD-ROM area 260 occur. The initialization process 300 then enables the processor's fault detection and handling mechanism. Control is then transferred back to the system initialization process.

Once initialized, application programs may access the emulated CD-ROM 260. When such an access occurs and is detected by processor 12, the processor 12 generates an access fault signal 230 (FIG. 2), which is detected by the access monitor 240. In response, the access monitor 240 generates a CD-ROM access signal 250. The access monitor 240 then obtains the CD-ROM address supplied by the application program and locates the corresponding data in the emulated CD-ROM 260. The access monitor 240 subsequently transfers data from the emulated CD-ROM 260 to a predetermined destination. Upon completion of this task, program control is returned to the application program. The execution process 400 then terminates.

Figure 3:
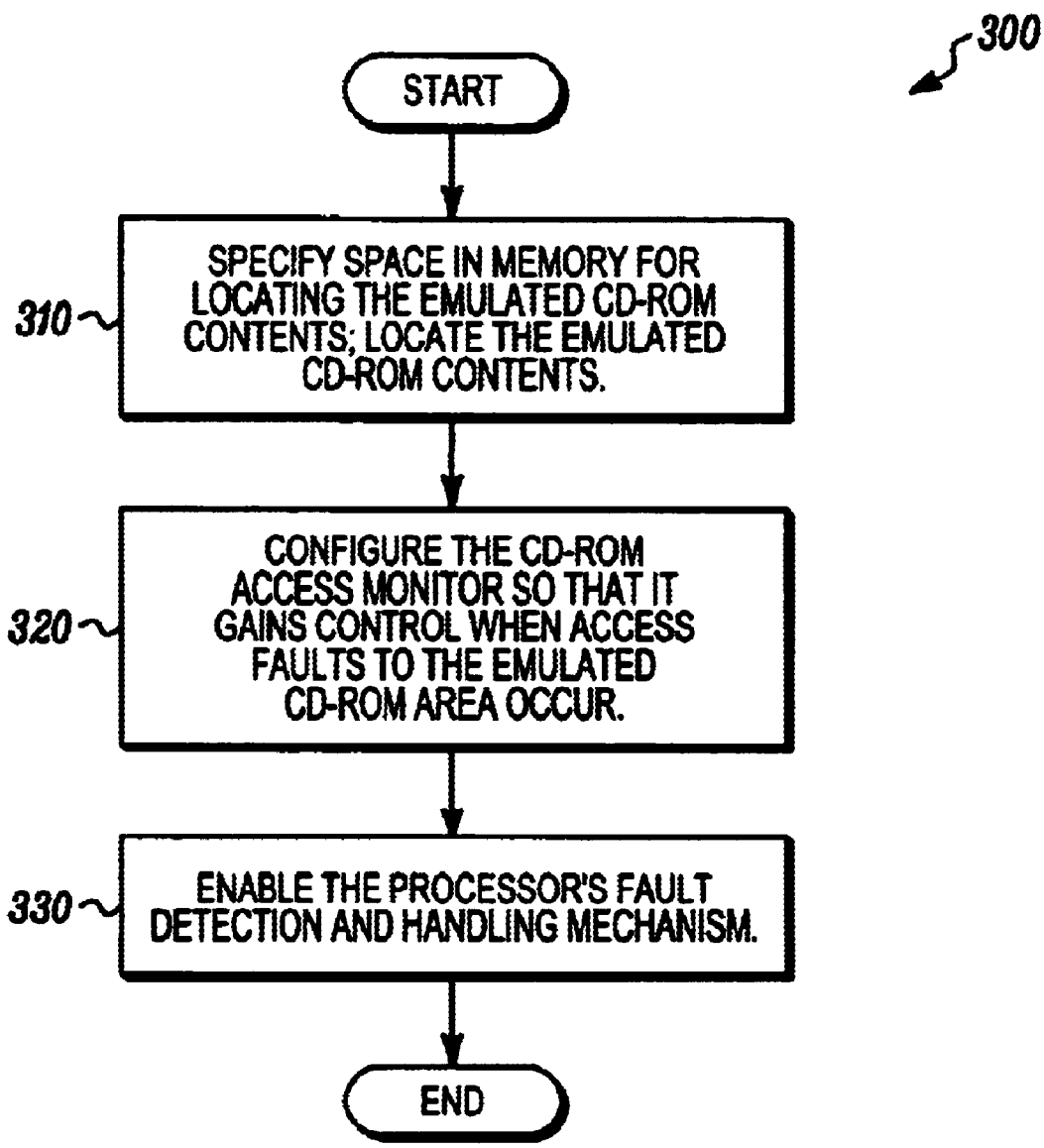
FIG. 3 is a flowchart illustrating one embodiment of the initialization process 300 of the present invention.

FIG. 3 is a flowchart illustrating one embodiment of the initialization process 300 of the present invention in an environment prior to loading and booting of the operating system. The initialization process 200 may proceed after installation of the emulated CD-ROM 260 on the processor system 10. Proceeding from a start state, the initialization process 300 advances to process block 310, where the process 300 locates the emulated CD-ROM 260 contents. At this juncture, the processor 12 may also specify memory locations that will be used to store the emulated CD-ROM 260 data that will subsequently be used by the application program 210. The process 300 then advances to process block 320 where the processor 12 configures the access monitor 240 (FIG. 2) to enable it to gain control when access faults 230 to the emulated CD-ROM area 260 occur. Next, the processor's fault detection and handling mechanism is enabled, as shown in process block 330. The initialization process 300 then terminates. Once initialization is complete, the system continues with the normal boot process.

Figure 4:
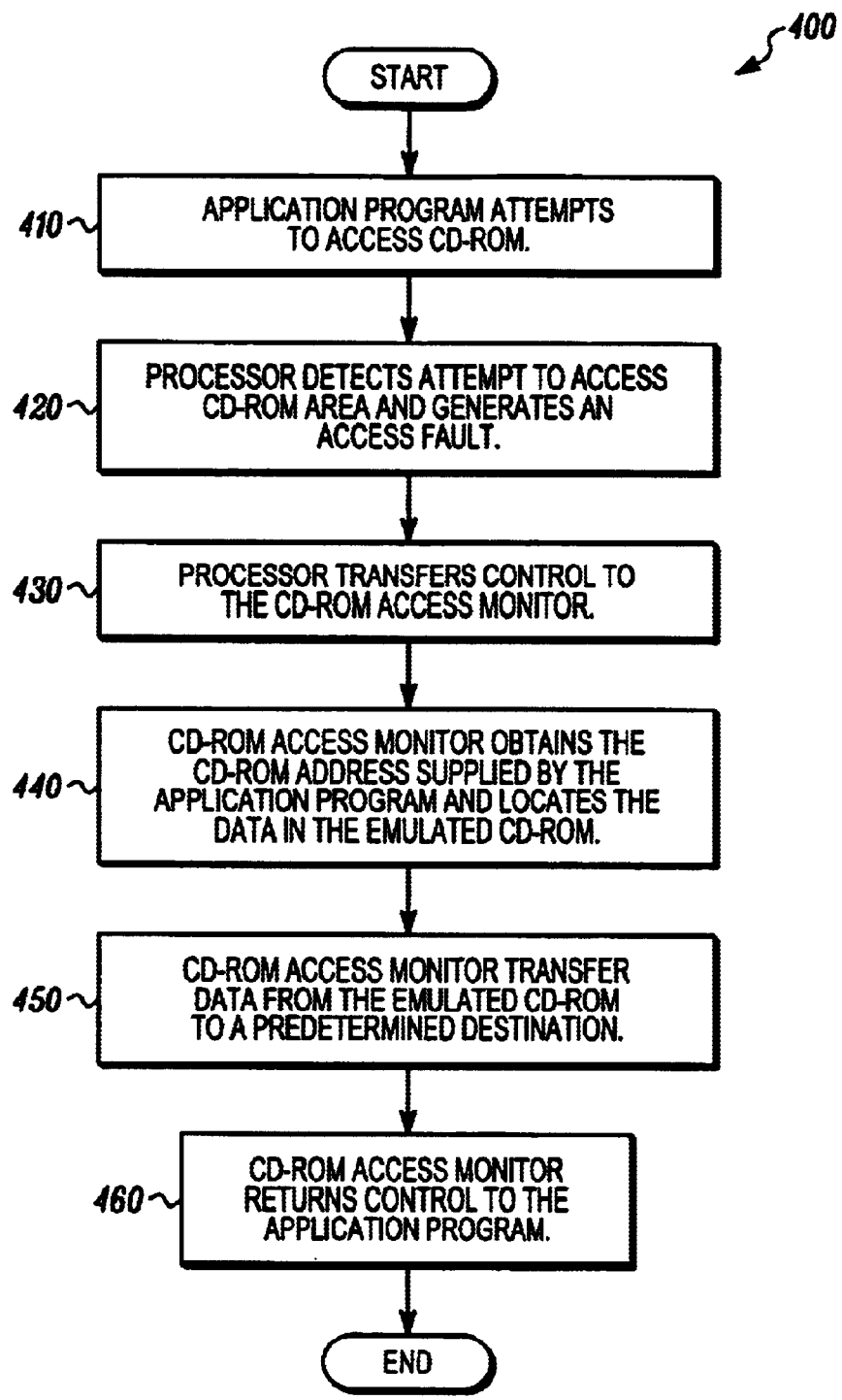
FIG. 4 is a flowchart illustrating one embodiment of the execution process 400 of the present invention.

FIG. 4 is a flowchart illustrating one embodiment of the execution process 400 of the present invention. The execution process 400 begins from a start state and proceeds to process block 410, where the application program 210 attempts to access the emulated CD-ROM 260. The processor 12 detects the attempt to access the emulated CD-ROM 260 area and generates an access fault 230 (FIG. 2), as shown in process block 420. The processor 12 then transfers control to the access monitor 240 (FIG. 2), as shown in process block 430. In one embodiment, when an attempt to access the emulated CD-ROM 260 area occurs, the processor 12 may attempt to detect the presence of a CD-ROM drive. However, the access monitor 240 is invoked, and the access monitor 240 will return data that makes it appear that a CD is present, whether or not a CD is present.

Upon receipt of the access fault 230 and program control, the access monitor 240 determines the address of the emulated CD-ROM 260 area that the application program 210 is attempting to access, as shown in process block 440.

The process 400 then advances to process block 450, where the access monitor 240 transfers data from the emulated CD-ROM 260 to a predetermined destination. The process 400 subsequently proceeds to process block 460, where the access monitor 240 returns control to the application program. The execution process 400 then terminates.

Figure 5:
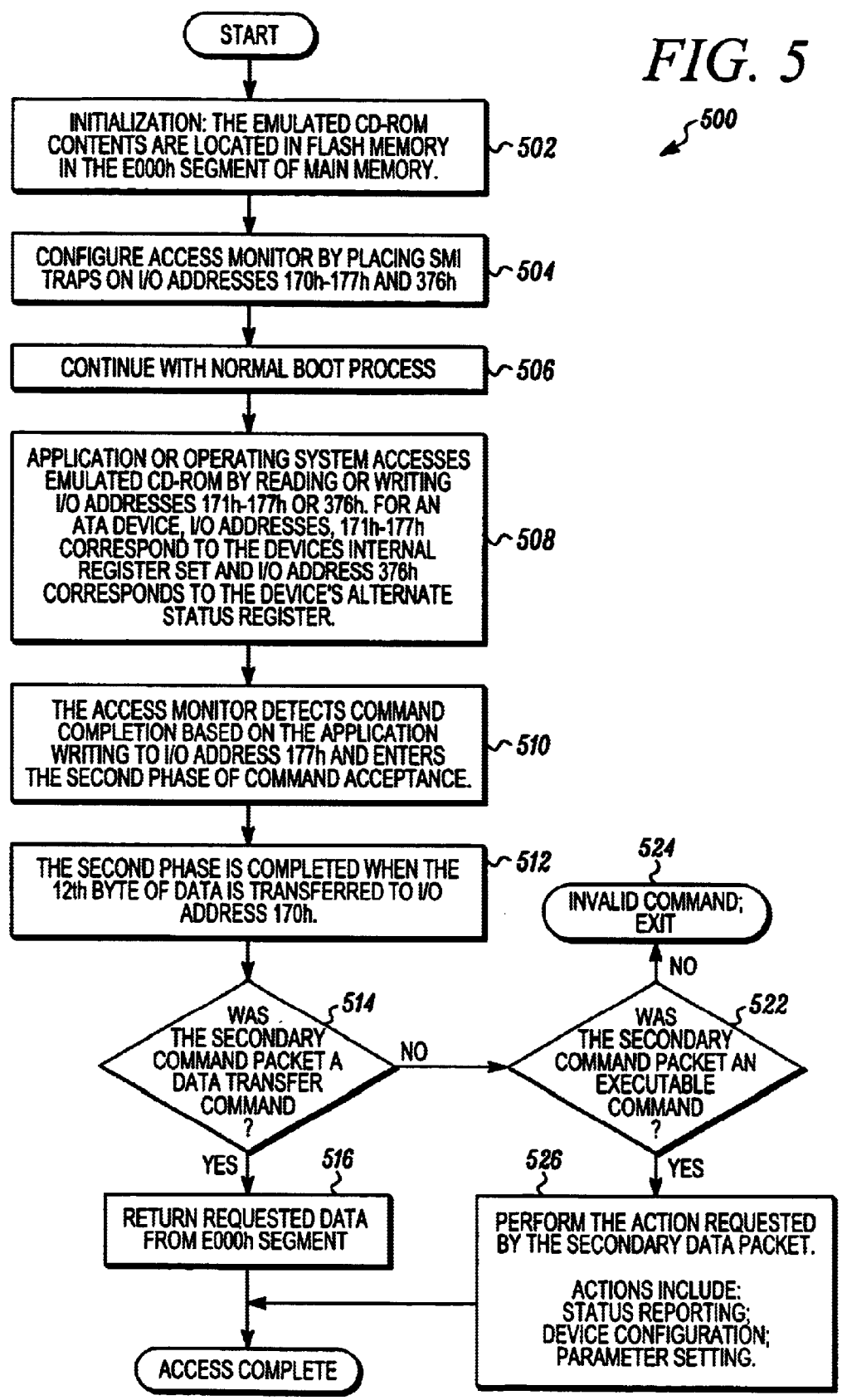
FIG. 5 is a flowchart illustrating one example of the CD-ROM emulation process of the present invention.

An example of implementing the CD-ROM emulation process of the present invention on an Intel Pentium™ processor will now be described. FIG. 5 is a flowchart illustrating one example of the CD-ROM emulation process 500 of the present invention. Beginning from a START state, the process 500 proceeds to process block 502, where initialization commences. In particular, the emulated CD-ROM contents 260 are located in flash memory 14*c*, e.g., in the E000h segment (i.e., E000h–F000h) of main memory 14. In using the Intel Pentium processor, the CD-ROM Input/Output (I/O) addresses include 170h–177h and 376h. The access monitor 240 is then configured so that it gains control when access faults to the emulated CD-ROM area occurs. For example, System Management Interrupt (SMI) traps are placed on I/O addresses 170h–177h, and 376h, as shown in process block 504. Once initialization is complete, the system continues with the normal boot process, as shown in process block 506.

When an application, or the operating system (OS) accesses the emulated CD-ROM by issuing a command to read from or write to I/O addresses 171h–177h or 376h, the access monitor is invoked, as shown in process blocks 508 and 510. For an Advanced Technology Attachment (ATA) device, I/O addresses 171h–177h correspond to the device's internal register set, and I/O address 376h corresponds to the device's alternate status register, as is known by one of skill in the technology. The beginning of the command issued by the application or OS is detected by the access monitor when the application or OS begins writing to I/O address 171h, and the completion of the command is detected when the application or OS completes writing to I/O address 177h, as shown in process block 510. The access monitor then enters the second phase of command acceptance, as shown in process block 510. As is known in the technology, the second phase of command typically includes acceptance of 12 bytes of command. The second phase of command acceptance is thus complete when the twelfth byte of data is transferred to I/O address 170h, as shown in process block 512.

The process 500 then advances to decision block 514, where it queries if the secondary command packet was a data transfer command. If so, the process 500 proceeds to process block 516, where it returns the requested data from the E000h segment of main memory 14. The access is then complete, as shown in process block 520. If, however, at decision block 514, the process 500 determines that the secondary command packet was not a data transfer command, it proceeds to decision block 522, where it inquires if the secondary command packet was an executable command. If so, the process 500 proceeds to process block 526, where it performs the action requested by the secondary data packet. Such actions include status reporting, device configuration and parameter setting. For example, if the access involves a request by the application to determine if a media is inserted (e.g., if a CD-ROM is inserted), the data is provided by the access monitor. The access is then complete, as shown in process block 520. If, however, at decision block 522, the secondary command packet was determined to be an unexecutable command, the process 500 proceeds to process block 524, where it indicates that the command received is an invalid command. The process 500 then exits.

Figure 6:
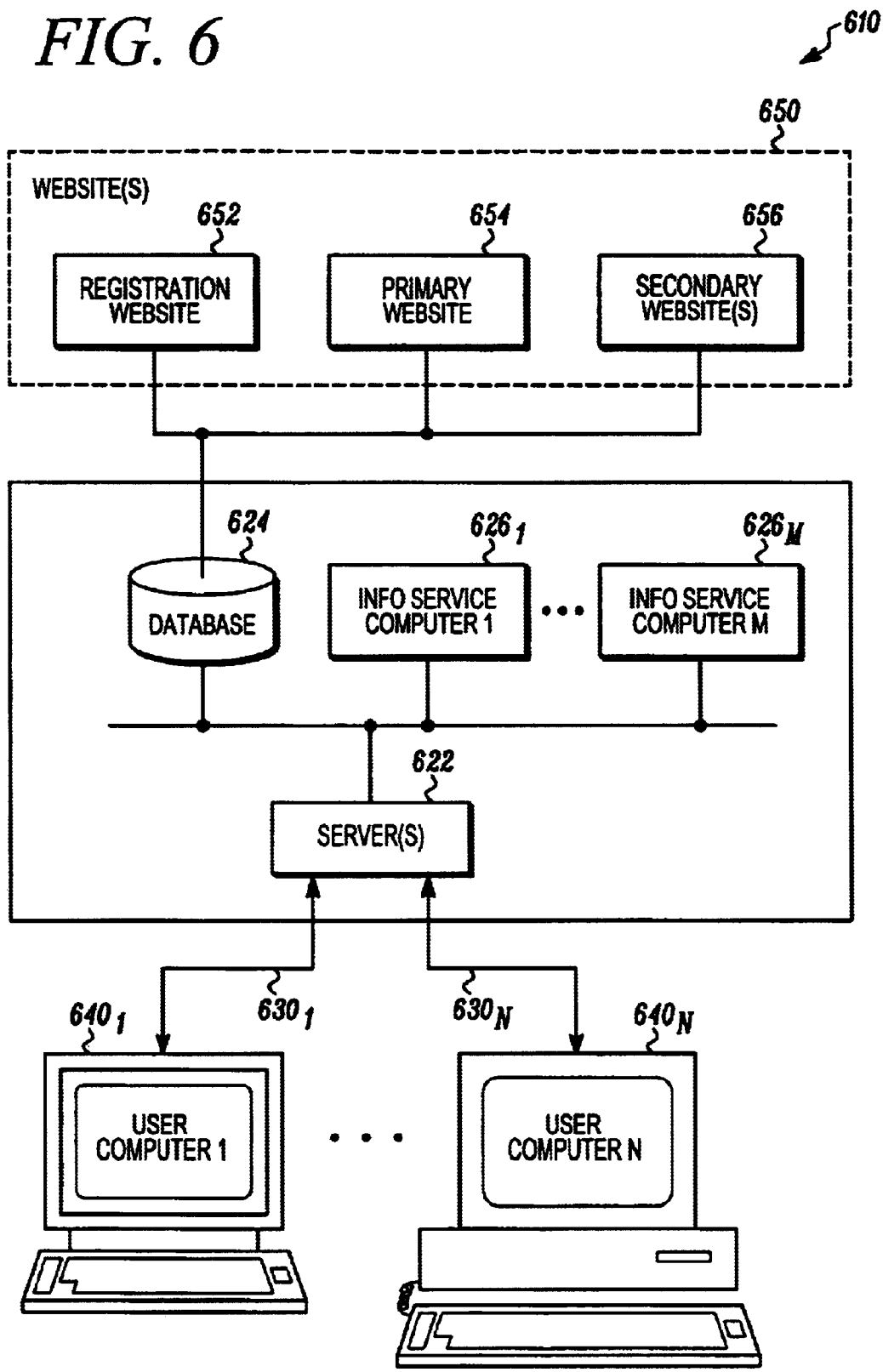
FIG. 6 is a system block diagram of one embodiment of an information distribution system in which the apparatus and method of the invention may be implemented.

A description of an exemplary system, which incorporates embodiments of the present invention, is hereinafter described. FIG. 6 shows a system block diagram of one embodiment of an information distribution system 610 in which the apparatus and method of the invention is used. The system 610 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application which in one embodiment, is the media emulation access technique previously described, will allow the launching of certain executable programs in the preboot environment. The application, which will be referred to for present discussion purposes as the first software module (in one embodiment, the first software module is the initial start-up application (ISUA), which will be described in the following sections), will allow the launching of one or more executable programs in the preboot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional files or payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer" filed Jun. 18, 1999, now U.S. Pat. No. 6,578,142 issued Jun. 10, 2003 assigned to Phoenix Technologies Ltd., the contents of which are incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 6, the information distribution system 610 comprises a service center 620 that is connected over one or more communications links $630_1$–$630_N$ to one or more user computer systems $640_1$–$640_N$ ("640"). The service center 620 includes one or more servers 622, one or more databases 624, and one or more computers $626_1$–$626_M$. The one or more computers $626_1$–$626_M$ are capable of simultaneous access by a plurality of the user computer systems $640_1$–$640_N$. If a plurality of computers are used, then the computers $626_1$–$626_M$ may be connected by a local area network (LAN) or any other similar connection technology. However, it is also possible for the service center 620 to have other configurations. For example, a smaller number of larger computers (i.e. a few mainframe, mini, etc. computers) with a number of internal programs or processes running on the larger computers capable of establishing communications links to the user computers.

The service center 620 may also be connected to a remote network 650 (e.g., the Internet) or a remote site (e.g., a satellite, which is not shown in FIG. 6). The remote network 650 or remote site allows the service center 620 to provide a wider variety of computer software, content, etc. that could be stored at the service center 620. The one or more databases 624 connected to the service center computer(s), e.g., computer $626_1$, are used to store database entries consisting of computer software available on the computer (s) 626. In one embodiment, each user computer $640_1$–$640_N$ has its own secure database (not shown), that is not accessible by any other computer. The communication links $630_1$–$630_N$ allow the one or more user computer systems $640_1$–$640_N$ to simultaneously connect to the computer(s) $626_1$–$626_M$. The connections are managed by the server 622.

After a user computer system 640 establishes two-way communications with the information service computer 626, the content is sent to the user computer system 640 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 620, which provides additional content to the user computer 640 based on the user and system profile. The database entries from the database connected to the service computer 626 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 626 to the user computer. Alternatively, the user may purchase the desired product or service from the summary of available products and services.

Figure 7:
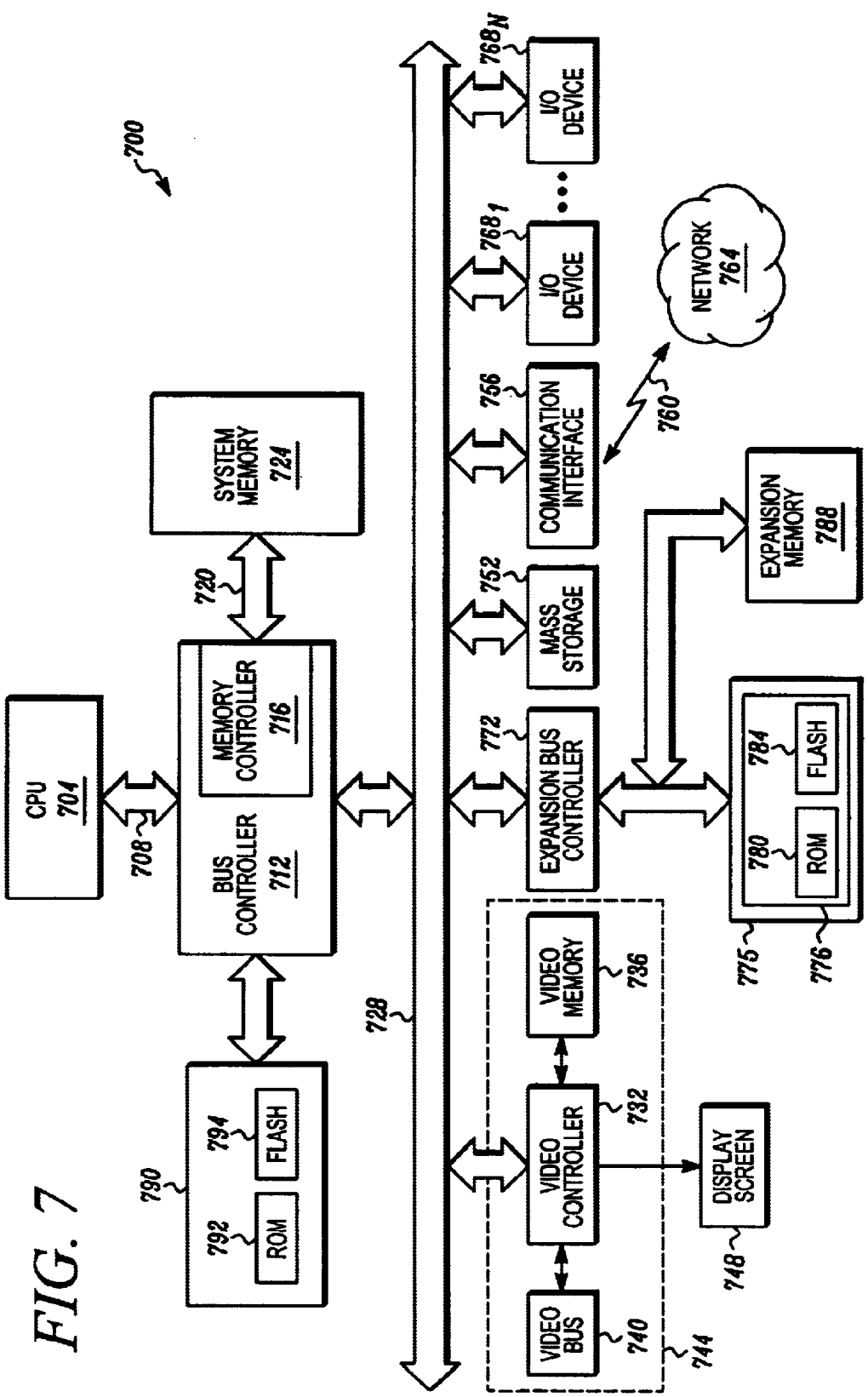
FIG. 7 illustrates an exemplary processor system or user computer system which implements embodiments of the present invention.

FIG. 7 illustrates an exemplary computer system 700 that implements embodiments of the present invention. The computer system 700 illustrates one embodiment of user computer systems $640_1$–$640_N$ and/or computers $626_1$–$626_M$ (FIG. 6), although other embodiments may be readily used.

Referring to FIG. 7, the computer system 700 comprises a processor or a central processing unit (CPU) 704. The illustrated CPU 704 includes an Arithmetic Logic Unit (ALU) for performing computations, a collection of registers for temporary storage of data and instructions, and a control unit for controlling operation for the system 700. In one embodiment, the CPU 704 includes any one of the x86, Pentium™, Pentium II™, and Pentium PrO™ microprocessors as marketed by Intel™ Corporation, the K-6 microprocessor as marketed by AMD™, or the 6×86MX microprocessor as marketed by Cyrix™Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 704. The CPU 704 is not limited to microprocessor but may take on other forms such as microcontrollers, digital signal processors, reduced instruction set computers (RISC), application specific integrated circuits, and the like. Although shown with one CPU 704, computer system 700 may alternatively include multiple processing units.

The CPU 704 is coupled to a bus controller 712 by way of a CPU bus 708. The bus controller 712 includes a memory controller 716 integrated therein, though the memory controller 716 may be external to the bus controller 712. The memory controller 716 provides an interface for access by the CPU 704 or other devices to system memory 724 via memory bus 720. In one embodiment, the system memory 724 includes synchronous dynamic random access memory (SDRAM). System memory 724 may optionally include any additional or alternative high speed memory device or memory circuitry. The bus controller 712 is coupled to a system bus 728 that may be a peripheral component interconnect (PCI) bus, Industry Standard Architecture (ISA) bus, etc. Coupled to the system bus 728 are a graphics controller, a graphics engine or a video controller 732, a mass storage device 752, a communication interface device 756, one or more input/output (I/O) devices $768_1$–$768_N$, and an expansion bus controller 772. The video controller 732 is coupled to a video memory 736 (e.g., 8 Megabytes) and video BIOS 740, all of which may be integrated onto a single card or device, as designated by numeral 744. The video memory 736 is used to contain display data for displaying information on the display screen 748, and the video BIOS 740 includes code and video services for controlling the video controller 732. In another embodiment, the video controller 732 is coupled to the CPU 104 through an Advanced Graphics Port (AGP) bus.

The mass storage device 752 includes (but is not limited to) a hard disk, floppy disk, CD-ROM, DVD-ROM, tape, high density floppy, high capacity removable media, low capacity removable media, solid state, etc., and combinations thereof. The mass storage device 752 may include any other mass storage medium. The communication interface device 756 includes a network card, a modem interface, etc. for accessing network 764 via communications link 760. The I/O devices $768_1$–$768_N$ include a keyboard, mouse, audio/sound card, printer, and the like. The I/O devices $168_1$–$168_N$ may be a disk drive such as a compact disk drive, a digital disk drive, a tape drive, a zip drive, a jazz drive, a digital video disk (DVD) drive, a solid state memory device, a magneto-optical disk drive, a high density floppy drive, a high capacity media drive, a low capacity media drive, and/or any combination thereof. The expansion bus controller 772 is coupled to non-volatile memory 775, which includes system firmware 776. The system firmware 776 includes system BIOS 82, which is for controlling, among other things, hardware devices in the computer system 700. The system firmware 776 also includes ROM 780 and flash (or EEPROM) 784. The expansion bus controller 772 is also coupled to expansion memory 788 having RAM, ROM, and/or flash memory (not shown). The system 700 may additionally include a memory module 790 that is coupled to the bus controller 712. In one embodiment, the memory module 790 comprises a ROM 792 and flash (or EEPROM) 794.

As is familiar to those skilled in the art, the computer system 700 further includes an operating system (OS) and at least one application program, which in one embodiment, are loaded into system memory 724 from mass storage device 752 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 700, unless indicated otherwise. Such operations are sometimes referred to as being computer-executed. It will be appreciated that operations that are symbolically represented include the manipulation by CPU 704 of electrical signals representing data bits and the maintenance of data bits at memory locations in system memory 724, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

As discussed earlier, the computer system 700 may be used in place of the processor system 10 in implementing the media access emulation technique discussed in FIGS. 1–5 and in the accompanying text. With reference to FIG. 1, one embodiment of the memory-based storage device emulation access technique 200 of the present invention is illustrated. The storage device may be any memory-based storage device, including but not limited to a compact disk (CD) drive, a digital video disk (DVD) drive, a tape drive, a floppy disk drive, a hard disk drive and a magneto-optical disk drive, etc., as represented by MISC I/O devices #1–N in FIG. 1 of any of the mass storage device 752 or I/O devices $768_1$4 $768_N$. The application program 210 (FIG. 2) may be stored in memory 14 (FIG. 2), expansion memory 30 (FIG. 2) or be provided via any of the peripheral modules (MISC I/O #1, #2, . . . #N of FIG. 1). Alternatively, the application program 210 may be stored in system memory 724 (FIG. 7), in BIOS 776 (FIG. 7), in expansion memory 788 (FIG. 7) or in memory module 790. The application program 210 transfers attempts to access the CD-ROM 260 as an access fault 230 that is subsequently used to provide access to an emulated CD-ROM area 260. In one embodiment, the CD-ROM image or the original CD-ROM data and code may be stored in RAM 14a, ROM 14b, and/or in flash memory 14c of FIG. 2 or in system memory 724 (FIG. 7). Alternatively, the CD-ROM image may also be located in RAM 30a, ROM 30b and/or flash memory 30c of FIG. 2; or in ROM 780, Flash 784 or expansion memory 788 of FIG. 7, or in ROM 792, flash 794 in memory module 790. In one embodiment, a copy of the CD-ROM image, called the emulated CD-ROM 260, is located in RAM 14a or 30a (FIG. 2). Alternatively, the emulated CD-ROM 260 may be located in RAM in system memory 724 (FIG. 7) or RAM (not shown) in expansion memory 788 or in RAM (not shown) in memory module 790. Location of the emulated CD-ROM 260 in RAM 14a or 30a (FIG. 2) or RAM (not shown) in system memory 724 or expansion memory 788 (FIG. 7) or RAM (not shown) in memory module 790 facilitates faster access to the data and code stored in the CD-ROM while preserving the original data and code in the CD-ROM image. In one embodiment, the access monitor 240 is located in RAM 14a or 30a (FIG. 2). In an alternate embodiment, the access monitor 240 is located in RAM (not shown) in system memory 724 or expansion memory 788 (FIG. 7) or memory module 790.

Figure 8:
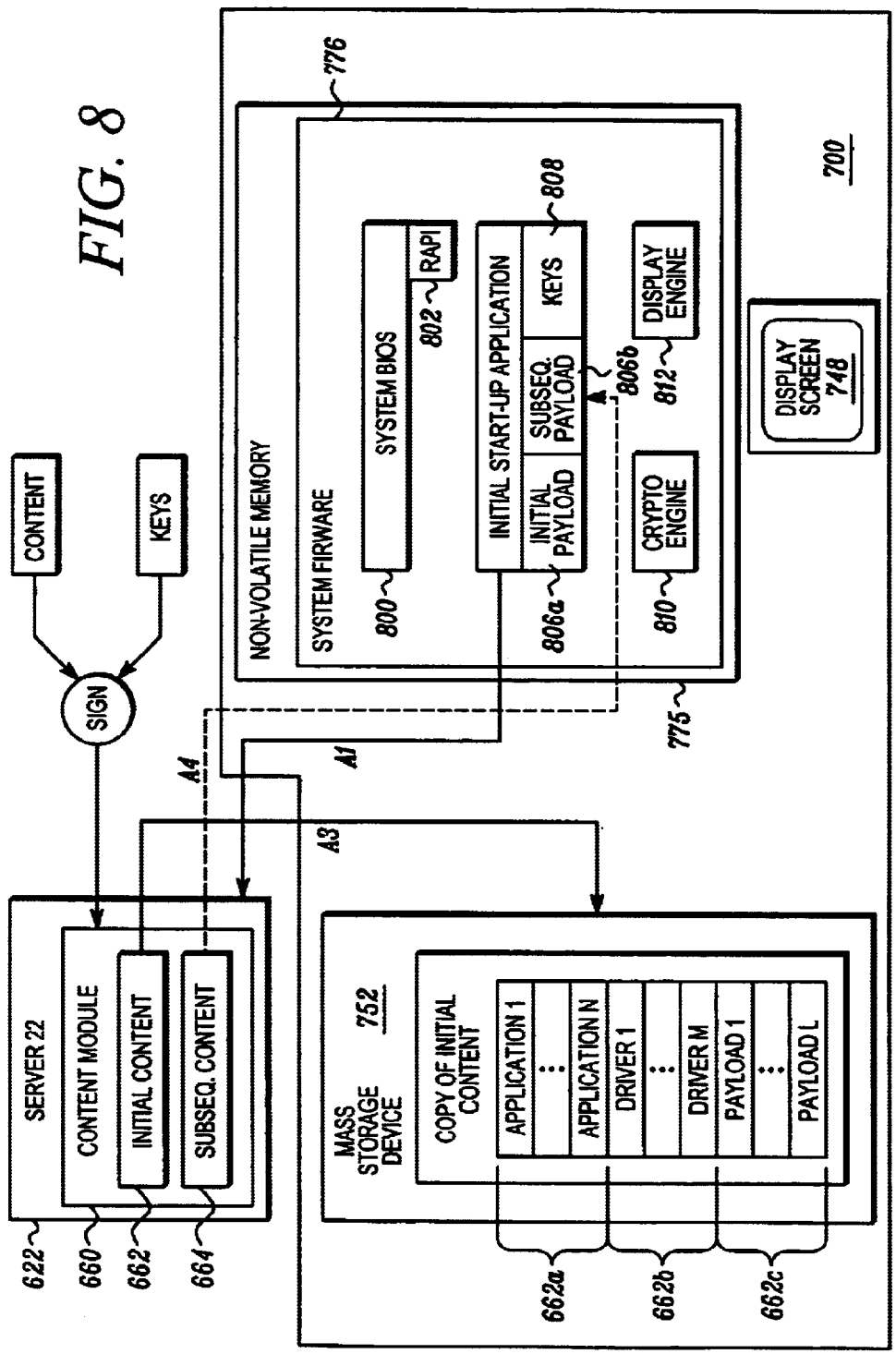
FIG. 8 illustrates a diagram of one embodiment of the invention.

FIG. 8 illustrates a logical diagram of computer system 700. Referring to FIGS. 7 and 8, the system firmware 776 includes software modules and data that are loaded into system memory 724 during POST and subsequently executed by the processor 704. In one embodiment, the system firmware 776 includes a system BIOS module 800 having system BIOS handlers, hardware routines, etc., a ROM application program interface (RAPI) module 802, an initial start-up application (ISUA) module 804, an initial payload 806a, cryptographic keys 808, a cryptographic engine 810, and a display engine 812. RAPI 802 provides a secure interface between ROM application programs and system BIOS 800. The aforementioned modules and portions of system firmware 776 may be contained in ROM 780 and/or flash 784. Alternatively, the aforementioned modules and portions of system firmware 776 may be contained in ROM 792 and/or flash 794. The RAPI 802, ISUA 804, and initial payload 806a may each be separately developed and stored in the system firmware 776 prior to initial use of the computer system 700. In one embodiment, the RAPI 802, ISUA 804, and initial payload 806a each includes proprietary software developed by Phoenix Technologies, Ltd. One embodiment of RAPI 802 is described in co-pending U.S. patent application Ser. No. 09/336,889 entitled "System and Method for Securely Utilizing Basic Input and Output System (BIOS) Services," filed on Jun. 18, 1999, now U.S. Pat. No. 6,148,387 issued Nov. 17, 2000, assigned to Phoenix Technologies, Ltd., and which is incorporated herein by reference. One embodiment of ISUA 804 is described in co-pending U.S. patent application Ser. No. 09/336,289 entitled "Method and Apparatus for Automatically Installing and Configuring Software on a Computer," filed on Jun. 18, 1999, now U.S. Pat. No. 6,578,142 issued Jun. 10, 2003, assigned to Phoenix Technologies, Ltd., the contents of which are incorporated herein by reference.

Figure 9A:
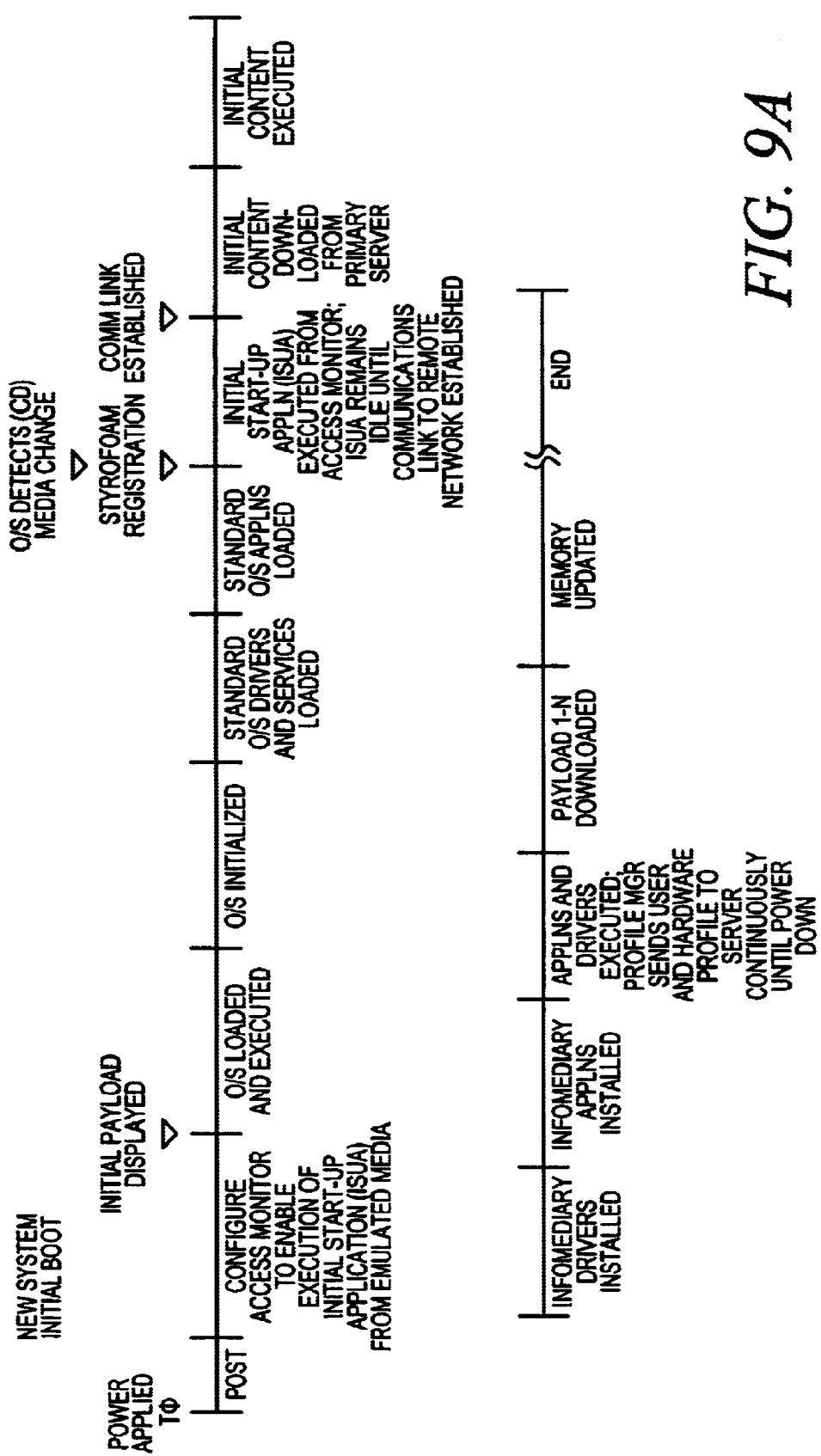
FIGS. 9A and 9B illustrate one embodiment of a system process flow chart provided in accordance with the principles of the invention.
Figure 9B:
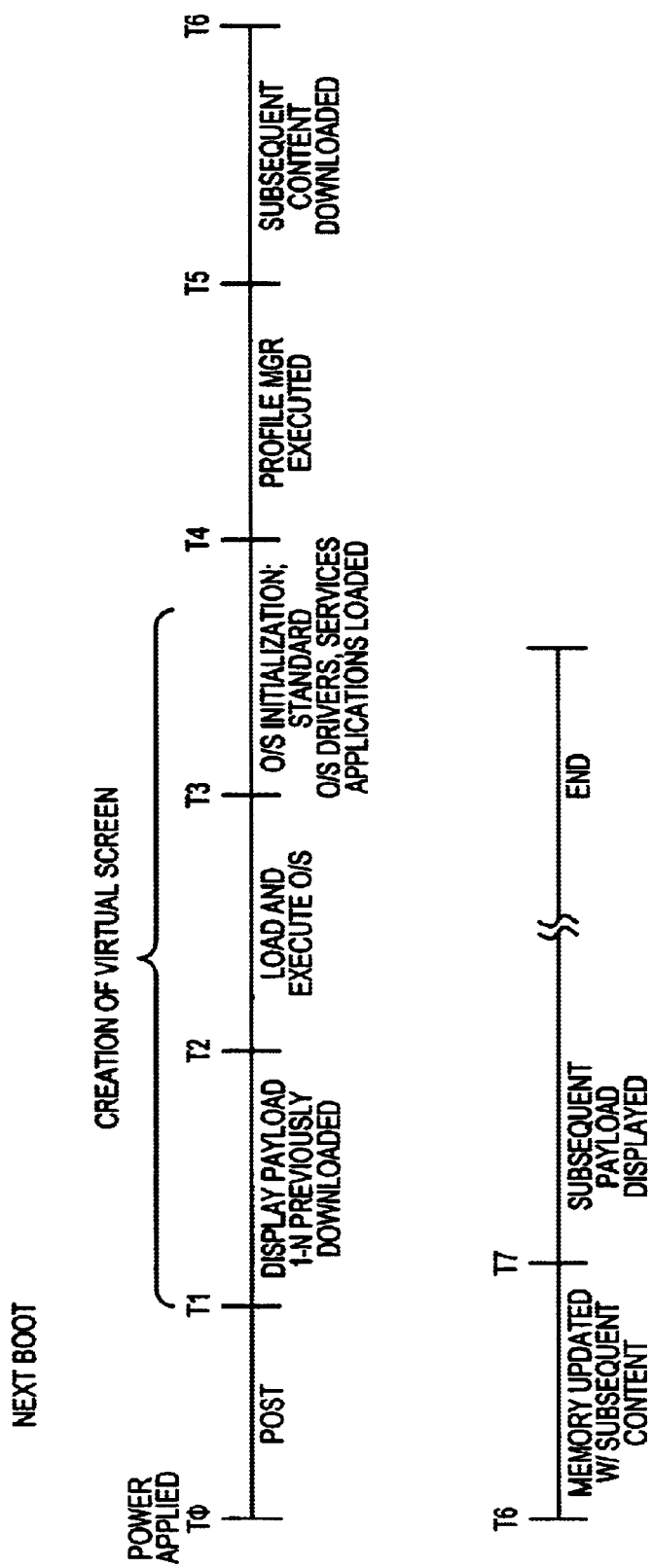

In one embodiment, as shown in FIGS. 8 and 9A and 9B, after power is initially turned on to a new computer system 700, the system commences with POST procedures. Next, the access monitor 240 (FIG. 2) is configured to enable execution of the ISUA 804 from the emulated media, such as an emulated CD ROM 260. In one embodiment, such a configuration process is made during the manufacturing and/or assembly process, when the system 700 is first powered up after the operating system has been installed (but prior to loading and running the operating system). In an alternative embodiment, such a configuration process may be made after the manufacturing and/or assembly process, after the user receives and powers up the system 700. During this configuration process, the initial payload 806a may be delivered from the ROM and displayed on the display screen 748. In one embodiment, the ISUA 804 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 622 and/or any one of the service computers 626 (FIG. 6), as described below. Moreover, in one embodiment, graphical content of the initial payload 806a is displayed by display engine 812 on the user's display screen 748 during POST. Alternatively, the graphical content of the initial payload 806a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. When the operating system detects a media change, such as a CD media change, it will generate an access fault, as previously described. In response to the access fault, the CD-ROM access monitor 240 transfers the access to an access to the emulated media, such as the emulated CD-ROM 260 (FIG. 2). Thus, the ISUA 804 is executed by the access monitor 240, and runs in the background, remaining idle until it detects a communication link established between the computer system 700 and a remote server (e.g., server 622 of FIG. 6) over Network 764 of FIG. 7 (e.g., over the Internet). It should be noted that although the ISUA 804 is shown as being stored in system firmware 776, it may alternatively be located in system memory 724, memory module 790, mass storage 752, any of the I/O devices 768 or provided via communication interface 756.

In one embodiment, the ISUA 804 may search through the operating system to determine if there are applications that have been pre-loaded and pre-installed onto the system. If so, the ISUA 804 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 630 is established, the ISUA 804 issues a request signal to the server 622 (as shown by A1) to download an initial content package 662 from a content module 660. Responsive to the request, the server downloads the initial content package 662 (as shown by A3), which, in one embodiment, is stored in the mass storage device 752. In one embodiment, the initial content 662 and subsequent content 664 may be developed separately, and each is encrypted and/or digitally signed using encryption keys, prior to storing of the initial content 662 and subsequent content 664 on the server 622. When the initial content 662 and/or subsequent content 664 is/are subsequently downloaded into system 700, the crypto engine 810 will use keys 808 to decrypt the initial content 662 and/or subsequent content 664.

As discussed earlier, the initial content package 662 may include applications 662a, drivers 662b, and payloads 662c. In one embodiment, the applications 662a include a data loader application and a profile manager application. The data loader application functions in the same or a similar manner as ISUA 804, and once downloaded, disables and replaces the ISUA 804. More specifically, the data loader application is a computer software program which is also capable of initiating, establishing, and terminating two-way communications between the server 622 and the computer system 700. The data loader application also provides traffic control management between the server 622 and computer system 700, as well as other functions to facilitate communication between the end user's system and the designated server, and content downloading to the end user's system.

The profile manager obtains the user and system profiles of the computer system 700 based on user preferences, system hardware, and software installed at the computer system 700. Upon obtaining the user and system profile of the computer system 700, the profile manager application forwards the results to the data loader application, which subsequently provides the information to the server 622, which matches the user indicted preferences with database 624 (FIG. 6). The results may be forwarded at predetermined intervals or at the user's request. The server 622 then processes the user profile or demographic data and targets content to the users that have similar profiles. In addition, the user profile data of a plurality of users are compiled on the server 622 and aggregated to create an aggregate user profile model. Content is then transmitted to user computer system's based on the user profile data and/or the aggregate user profile model (as shown by A4). The subsequent content 664 is downloaded and stored in system firmware 776, designated by numeral 806b. In one embodiment, the subsequent content 664 is stored in non-volatile memory such as flash or EEPROM, with the loading of the subsequent content being done by re-flashing the ROM, as is well known by those skilled in the art. The subsequent content 664 may also be stored as one or more files on mass storage device 752 or may be used to modify the Windows™ system file (under the Windows™ environment). The profile collection process is continued as long as the computer system 700 is activated. In one embodiment, content may be downloaded after the user's profile is received and analyzed at the server 622.

When the computer system 700 is subsequently powered up (see FIG. 9B), the system again performs POST. The content that was previously downloaded and stored in system firmware 776, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 776.

In the case of storing the content as one or more files on the mass storage device 752, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, now U.S. Pat. No. 6,373,498 issued Apr. 16, 2002, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

The present invention thus provides a system and method for providing storage device (such as compact disk (CD) drive, digital video disk (DVD) drive, digital disk drive tape drive, floppy drive, hard drive, magneto-optical drive, document scanner solid state memory device, zip drive, jazz drive, high density floppy drive (such as the Sony Hi FD drive) high capacity removable media device, and combination high and low capacity removable media device (such as the Panasonic LS 120/Super disk drive)) emulation. As a result, applications typically stored on storage devices may be utilized in cases where the storage device drives are not available in a processor system. In addition, special software installed from the storage device that is required for driving hardware may be shipped along with the hardware without the need for the storage device itself. The use of the present invention also enables the operating system to use BIOS-based application. As a result, greater programming flexibility is provided.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. In a computer system having a user computer in communication with a remote service computer having access to a database identifying information available to the service computer, a computer implemented method for transferring information to the user computer, comprising:

(a) detecting, using an access monitor program, an access by an application program to at least one readable hardware storage element in the user computer;

(b) transferring, using the access monitor program, the access to the at least one readable hardware storage element to an access to at least one readable emulated storage location of the user computer, where said at least one readable emulated storage location is separate from said at least one readable hardware storage element;

(c) processing an instruction sequence corresponding to the access by the application program to the at least one readable hardware storage element;

(d) transferring, when the access is a read request, data from the readable emulated storage location to a predetermined location on the user computer from which the application program accesses the data;

(e) establishing a communications link between the user computer and the service computer; and (f) presenting at the user computer, information available to the user computer.

2. The method of claim 1, wherein in (a), the contents of the at least one hardware storage element includes the application program, and wherein the method further comprising:

initiating, by the application program, a transfer of software from the service computer to the user computer; and receiving, by the user computer, said software, wherein the software comprises at least one program that collects system information regarding the user computer.

3. The method of claim 2, further comprising:

providing the system information to the service computer; and presenting, by service computer to the user computer, additional information based on the system information.

4. The method of claim 1, wherein in (a), the at least one readable storage element is a memory-based device.

5. The method of claim 4, wherein in (a) the memory-based device is selected from a group consisting of: a compact disk drive, a digital disk drive, a digital video disk (DVD) drive, a solid state memory device, a floppy disk drive, a hard disk drive, a magneto-optical disk drive, a tape drive, a zip drive, a jazz drive, a high density floppy drive, a high capacity removable media device, a low capacity media device, and a combination high and low capacity removable media device.

6. The method of claim 1, wherein in (b) the at least one readable emulated storage location is an emulated read-only memory.

7. The method of claim 6, wherein in (b) the emulated read-only memory is a flash memory.

8. The method of claim 1, wherein (b) comprises:
- (b)(1) generating an access fault in response to the access to the at least one readable hardware storage element; and
- (b)(2) transferring, using the access monitor program, the access to the at least one readable hardware storage element to an access to the at least one readable emulated storage location.

9. The method of claim 8, wherein the at least one readable emulated storage location is an emulated read-only memory, the at least one readable hardware storage element is located in a memory-based device, the predetermined location is in a memory of the user computer, and wherein the method further comprises:
- allocating space in the memory of the user computer for the emulated read-only memory; and
- allocating space in the memory of the user computer to store the data transferred from the emulated read-only memory due to the read request by the application program.

10. An information processing system having a user computer in communication with a remote service computer having access to a database identifying information available to the service computer, comprising:
- a memory for storing instruction sequences by which the system is processed, the memory having at least one readable emulated storage location; and
- a processor coupled to said memory, the processor executes the stored instruction sequences;
- wherein the stored instruction sequences cause the processor to: (a) detect, using an access monitor program, an access by an application program to at least one readable hardware storage element in the user computer; (b) transfer, using the access monitor program, the access to the at least one readable hardware storage element to an access to the at least one readable emulated storage location, where said at least one readable emulated storage location is separate from said at least one readable hardware storage element; (c) process an instruction sequence corresponding to the access by the application program to the at least one readable hardware storage element, to establish a communications link between the user computer and the service computer; (d) transferring, when the access is a read request, data from the readable emulated storage location to a predetermined location on the user computer from which the application program accesses the data; and (e) present at the user computer, information available to the user computer.

11. The system of claim 10, wherein in (a), the contents of the at least one readable hardware storage element includes the application program having instruction sequences that further cause the processor to:
- initiate, by the application program, a transfer of software from the service computer to the user computer; and
- receive, by the user computer, said software, wherein the software comprises at least one program that collects system information regarding the user computer.

12. The system of claim 11, wherein the instruction sequences further cause the processor to:
- provide the system information to the service computer; and to cause the service computer to present additional information to the user computer, based on the system information.

13. The system of claim 10, wherein the at least one readable storage element is a memory-based device.

14. The system of claim 13, wherein the memory-based device is selected from a group consisting of: a compact disk drive, a digital disk drive, a digital video disk (DVD) drive, a solid state memory device, a floppy disk drive, a hard disk drive, a magneto-optical disk drive, a tape drive, a zip drive, a jazz drive, a high density floppy drive, a high capacity removable media device, a low capacity media device, and a combination high and low capacity removable media device.

15. The system of claim 10, wherein the at least one readable emulated storage location is an emulated read-only memory.

16. The system of claim 15, wherein the emulated read-only memory is a flash memory.

17. The system of claim 10, wherein (b) comprises:
- (b)(1) generate an access fault in response to the access to the at least one readable hardware storage element; and
- (b)(2) transfer, using the access monitor program, the access to the at least one readable hardware storage element to an access to the at least one readable emulated storage location.

18. The system of claim 17, wherein the at least one readable emulated storage location is an emulated read-only memory, the at least one readable hardware storage element is located in a memory-based device, the predetermined location is in the memory, and wherein the instructions further cause the processor to:
- allocate space in the memory for the emulated read-only memory; and
- allocate space in the memory to store the data transferred from the emulated read-only memory due to the read request by the application program.

19. An information processing system having a user computer in communication with a remote service computer, the system comprising:
- a memory for storing instruction sequences by which the system is processed; and
- a processor coupled to said memory, the processor executes the stored instruction sequences to:
  - allocate space in the memory for an emulated read-only memory;
  - detect, using an access monitor program; an access by an application program to at least one readable hardware storage element in the user computer;
  - transfer the access to the at least one readable hardware storage element to said emulated read-only memory;
  - establish a communications link between the user computer and the service computer;
  - transferring, when the access is a read request, data from the emulated read-only memory to a predetermined location on the user computer from which the application program accesses the data; and
  - present at the user computer, information available to the user computer.

20. The system of claim 19, wherein the at least one readable hardware storage element includes the application program, the method further comprising:
- initiating, by the application program, a transfer of software from the service computer to the user computer; and
- receiving, by the user computer, said software, wherein the software comprises at least one program that collects system information regarding the user computer.

21. The system of claim 20, further comprising:
- providing the system information to the service computer; and presenting, by the service computer to the user computer, additional information based on the system information.

22. The system of claim 19, wherein the at least one readable hardware storage element is a memory-based device selected from the group consisting of: a compact disk drive, a digital disk drive, a digital video disk drive, a solid state memory device, a floppy drive, a hard disk drive, a magneto-optical disk drive, a tape drive, a zip drive, a jazz drive, a high density floppy drive, a high capacity removable media device, a low capacity media device, and a combination high and low capacity removable media device.

23. The system of claim 19, wherein the emulated read-only memory is a flash memory.

24. The system of claim 19, wherein transferring the access to the at least one readable hardware storage element further comprises generating a fault in response to the access to the at least one readable hardware storage location of the user computer.

25. In a computer system having a user computer in communication with a remote service computer, the method comprising:
   allocating space in a memory of the user computer for an emulated read-only memory;
   detecting, using an access monitor program, an access by an application program to at least one readable hardware storage element in the user computer;
   transferring the access to the at least one readable hardware storage element to an access to the emulated read-only memory;
   transferring, when the access is a read request, data from the emulated read-only memory to a predetermined location on the user computer from which the application program accesses the data;
   allocating space in said memory to store the data transferred from the emulated read-only memory due to the read request by the application program;
   establishing a communications link between the user computer and the service computer; and
   presenting at the user computer, information available to the user computer.

26. The method of claim 25, wherein the at least one readable hardware storage element includes the application program, the method further comprising:
   initiating, by the application program, a transfer of software from the service computer to the user computer; and
   receiving, by the user computer, said software, wherein the software comprises at least one program that collects system information regarding the user computer.

27. The method of claim 26, further comprising:
   providing the system information to the service computer; and
   presenting, by the service computer to the user computer, additional information based on the system information.

28. The method of claim 25, wherein the at least one readable hardware storage element is a memory-based device selected from the group consisting of: a compact disk drive, a digital disk drive, a digital video disk drive, a solid state memory device, a floppy drive, a hard disk drive, a magneto-optical disk drive, a tape drive, a zip drive, a jazz drive, a high density floppy drive, a high capacity removable media device, a low capacity media device, and a combination high and low capacity removable media device.

29. The method of claim 25, wherein the emulated read-only memory is a flash memory.

30. The method of claim 25, wherein transferring the access to the at least one readable hardware storage element further comprises generating a fault in response to the access to the at least one readable hardware storage location of the user computer.

31. A computer program product, comprising:
   a computer usable medium having computer program code embodied therein for accessing at least one readable storage in a processor-based system, the computer program product having:
   (a) computer readable program code embodied in an access monitor program, for detecting an access by the application program to at least one readable hardware storage element;
   (b) computer readable program code embodied in the access monitor program for transferring the access to the at least one readable hardware storage element to an access to at least one readable emulated storage location, where said at least one readable emulated storage location is separate from said at least one readable hardware storage element;
   (c) computer readable program code for processing an instruction sequence corresponding to the access by the application program to the at least one readable hardware storage element;
   (d) transferring, when the access by the application program is a read request, data from the readable emulated storage location to a predetermined location from which the application program accesses the data;
   (e) computer readable program code for establishing a communications link between the user computer and the service computer; and
   (f) computer readable program code for presenting at the user computer, information available to the user computer.

32. The computer program product of claim 31, wherein in (a), the contents of the at least one readable hardware storage element includes the application program, further comprising:
   computer readable program code for initiating, by the application program, a transfer of software from the service computer to the user computer; and
   computer readable program code for receiving, by the user computer, said software, wherein the software comprises at least one program that collects system information regarding the user computer.

33. The computer program product of claim 32, further comprising:
   computer readable program code for providing the system information to the service computer; and
   computer readable program code for presenting, by the service computer to the user computer, additional information based on the system information.

* * * * *